Nov. 19, 1929.  A. S. HAWKS  1,736,312
ENGINE CYLINDER LUBRICATOR
Filed June 25, 1926

INVENTOR
Arthur S. Hawks
BY Jeffery Kimball & Eggleston
ATTORNEYS

Patented Nov. 19, 1929

1,736,312

UNITED STATES PATENT OFFICE

ARTHUR S. HAWKS, OF ST. LOUIS, MISSOURI, ASSIGNOR TO BUSCH-SULZER BROS.- DIESEL ENGINE COMPANY, OF ST. LOUIS, MISSOURI, A CORPORATION OF MISSOURI

ENGINE-CYLINDER LUBRICATOR

Application filed June 25, 1926. Serial No. 118,460.

This invention relates to engine lubrication and in particular to the provision of an improved and simplified device for conveying lubricating oil to the cylinder walls or liners of water-jacketed engine cylinders, the object being, among other things, to distribute the oil to the desired points without the formation of air traps in the system, and to avoid any possibility of injury to the conducting means as the result of unequal thermal expansions.

Figure 1:
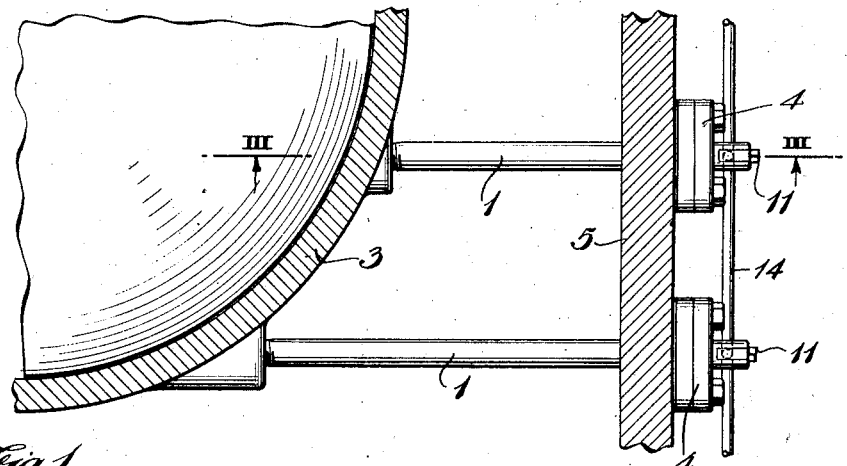

Reference is made to the accompanying drawings in which Fig. 1 is a horizontal section of a portion of a jacketed engine cylinder showing two of the improved lubricating devices applied thereto.

Figure 2:
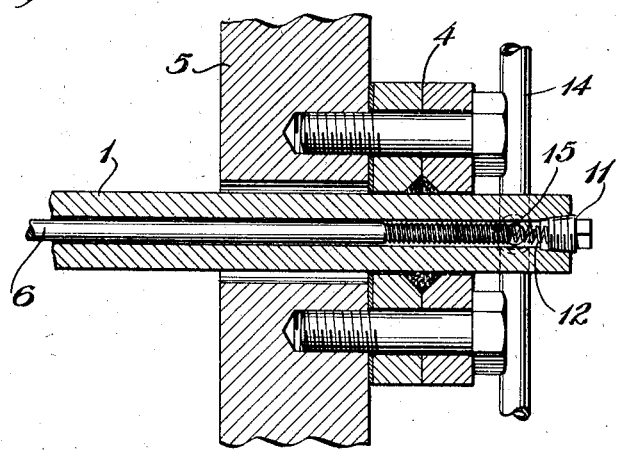
Figure 3:
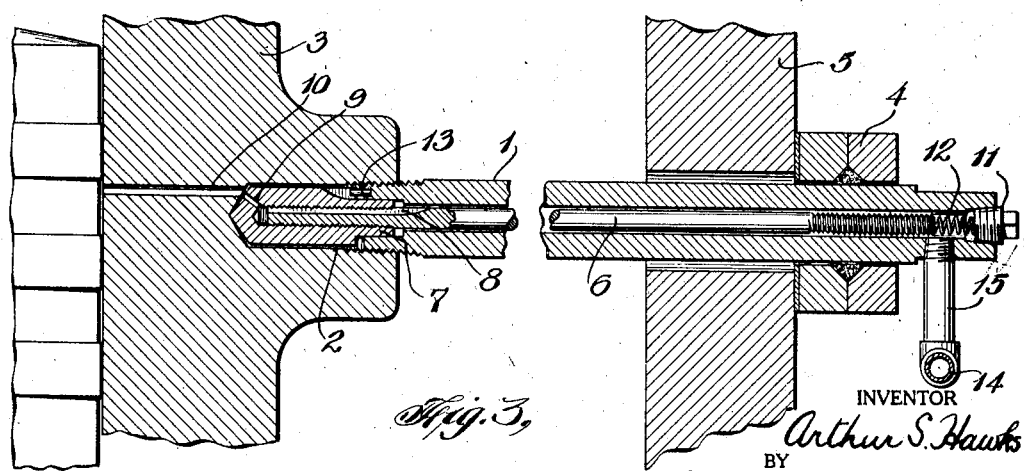

Fig. 2 is a horizontal section on an enlarged scale showing the manner of assembling the lubricating device where it extends through the water jacket casing and Fig. 3 is a vertical section, partly broken away for convenience and on a larger scale, on the line III—III of Fig. 1.

The device consists of a plug-like member which can be readily introduced through the jacket wall 5 into connection with a socket and oil duct in the cylinder proper or liner 3. The body 1 is tubular, having a threaded engagement at its inner end with a socket 2 which is formed in the cylinder wall 3 and at its other end passing through a relatively large hole in the jacket wall 5 and through a gland 4 secured to the latter. The gland serves also as a cover for the hole in the jacket wall and the gland packing affords a certain freedom of movement for the body 1 relatively to the jacket which enables it to accommodate relative movement between line and jacket both laterally and longitudinally without undue strain. Within the body 1 there is loosely mounted a filler member 6 on the inner end of which, within the socket 2, is secured an end plug 7. This end plug is telescoped within the end of the tubular body 1 and, as shown, fits loosely within the socket 2, the tip of the plug being tapered or otherwise formed so that it does not fit tightly against the socket end. The plug is held against relative rotation on the end of the body by a pin 13 fixed in the latter and engaging the former.

The filler member 6 is provided with a slot 8, which, in effect, forms a continuation of the annular oil passage between the filler member and the bore of the body 1. In the end of the plug 7, there is provided an oblique hole 9, which terminates adjacent the oil duct 10, which latter extends from the upper part of the chamber 2 to the inner surface of the cylinder or liner.

The outer end of the body 1 is provided with a closure 11 and between the closure and the filler member 6, and to hold the end plug in contact with the chamber end wall, there is preferably provided a spring 12. Lubricant is supplied from the feed line 14 through the branch pipes 15 which enter the underside of the body 1 adjacent its outer end.

By screwing the body into the liner so that the connection to the pipe 15 is downward, the oil hole 9 will be pointed upwards directly toward the oil duct 10 and the slot in the filler rod will be on the upper side of the latter close to the entrance to the hole 9 thereby tending to eliminate the possibility of any air traps in the device. It will be apparent that in the attainment of this result, the cross section of the oil path through the device is kept small, due to the presence of the filler rod, but is yet easily cleansed by the removal of the latter.

It will be understood that the arrangement and construction of the parts herein described and illustrated are merely exemplary and that the invention is subject to modification without departing from the scope of the following claims.

I claim—

1. A lubricating device for engine cylinders comprising in combination with the cylinder wall and the cylinder jacket, a lubricating plug body extending therebetween and communicating at its lowest point at one end with the lubricant supply and at the other end secured within a socket formed in said wall and a duct connecting the upper part of said socket with the working surface of the cylinder wall.

2. A lubricating device for engine cylinders comprising in combination with the cylinder wall and the cylinder jacket, a tubular body extending therebetween, a filler member within the body and providing an oil space therein communicating at one end with the lubricant supply and at the other end with a socket formed in the wall and a duct connecting the upper part of said socket with the working surface of the cylinder wall.

3. A lubricating device for engine cylinders comprising in combination with the cylinder wall and the cylinder jacket, a tubular body extending therebetween, a filler member within the body providing an oil space therein communicating at one end with the lubricant supply and at the other end with a socket formed in the wall, an end plug secured to said filler member and loosely fitting within said socket and a duct connecting the upper part of said socket with the working surface of the cylinder wall.

4. A lubricating device for engine cylinders comprising in combination with the cylinder wall and the cylinder jacket, a tubular body extending therebetween, a filler member within the body and providing an oil space therein communicating at one end with the lubricant supply and at the other end with a socket formed in the wall, an end plug secured to said filler member and loosely fitting within said socket, a passageway extending through said end plug and forming a continuation of said oil space, and a duct connecting the upper part of said socket with the working surface of the cylinder wall.

5. A lubricating device for engine cylinders comprising in combination with the cylinder wall and the cylinder jacket, a tubular body extending therebetween, a filler member within the body and providing an oil space therein communicating at one end with the lubricant supply and at the other end with a socket formed in the wall, an end plug secured to said filler member and loosely fitting within said socket, a passageway in said end plug forming a continuation of said oil space and terminating in an outlet opening obliquely into said socket and a duct connecting the upper part of said socket with the working surface of the cylinder wall.

6. A lubricating device for engine cylinders comprising in combination with the cylinder wall and the cylinder jacket, a tubular body extending therebetween, a filler member within the plug and providing an oil space therein communicating at one end with the lubricant supply and at the other end with a socket formed in the wall, an end plug forming a continuation of said oil space and terminating in an outlet opening obliquely into said socket, a duct connecting the upper part of said socket with the working surface of the cylinder wall, and means for preventing relative rotation of said body and end plug.

In testimony whereof, I have signed this specification.

ARTHUR S. HAWKS.